United States Patent
Schwerdhofer et al.

[15] 3,701,546
[45] Oct. 31, 1972

[54] BICYCLE AND GEAR SHIFTING ARRANGEMENT FOR THE SAME

[72] Inventors: Hans Joachim Schwerdhofer; Gerhard Max Wolf, both of Schweinfurt, Germany

[73] Assignee: Fichtel & Sachs AG, Schweinfurt, Germany

[22] Filed: Dec. 21, 1970

[21] Appl. No.: 100,330

[30] Foreign Application Priority Data

Dec. 24, 1969  Germany..........P 19 64 867.0

[52] U.S. Cl. ............................280/289, 74/489, 248/214, 248/230
[51] Int. Cl. .........................G05g 9/00, G05g 11/00
[58] Field of Search ........280/289; 74/473, 488, 489; 248/214, 230

[56] References Cited

UNITED STATES PATENTS

| 3,534,627 | 10/1970 | Schwerdhofer | 74/473 |
| 3,399,855 | 9/1968 | Shirai | 280/289 X |
| 2,775,845 | 1/1957 | Coates | 380/289 X |
| 3,426,614 | 2/1969 | Brilando et al. | 280/289 X |
| 3,524,979 | 8/1970 | Cohen | 74/488 X |
| 2,439,376 | 4/1948 | Aleks | 280/289 |
| 2,143,065 | 1/1939 | Glenny | 248/230 X |
| 2,218,408 | 10/1940 | Meyerhoefer | 280/289 X |
| 2,658,709 | 11/1953 | Kendall | 248/230 |
| 2,546,242 | 3/1951 | Stinson | 248/230 X |

Primary Examiner—Kenneth H. Betts
Assistant Examiner—John P. Silverstrim
Attorney—Kelman and Berman

[57] ABSTRACT

The gear shifting lever on a bicycle equipped with a multiple-speed transmission between the pedal shaft and the rear wheel is mounted centrally on the handle bar in such a manner that it projects upwardly from the handle bar and pivots in a plane which includes or is contiguously adjacent to the axis of the steering column and of the front wheel fork attached to the column.

4 Claims, 4 Drawing Figures

PATENTED OCT 31 1972

INVENTORS.
Hans Joachim Schwerdhöfer
Gerhard Max Wolf
BY: Kalman and Berman
AGENTS

BICYCLE AND GEAR SHIFTING ARRANGEMENT FOR THE SAME

This invention relates to bicycles, and particularly to a gear shifting arrangement for a bicycle equipped with a multiple-speed transmission in its drive train.

The gear shifting arrangement of most bicycles now in use includes a support member, a gear-shifting or speed-changing lever pivotally mounted on the support member, and a clamp which fastens the support member near a free end of the handle bar on the bicycle where the lever is accessible for operation by a finger of a hand while the hand grasps a rubber or plastic handle on the bar.

This arrangement is not convenient nor even safe on bicycles having high-rising handle bars whose handles may be above the eye level of the rider.

Gear shifting levers and their supports have also been mounted on the frames of bicycles, but this arrangement is not desirable on bicycles having high-rising handle bars which normally are associated with very small wheels and a very low frame. The highest available frame member is far below the handles of the handle bar, and the handle bar must be released by one hand for a relatively long period required for moving the hand down, shifting the lever, and returning the hand to its normal steering position.

The object of the invention is the provision of a gear shifting arrangement including a manually operated gear shifting lever which is equally applicable to a bicycle having the conventional frame and handle bar, and to a bicycle having a high rising handle bar and a frame whose top member may be no farther above the ground than it is below the saddle for the rider.

With these and other objects in view, the invention provides an improvement in a basically known gear shifting arrangement which includes a support member, a lever member mounted on the support member for pivoting movement about an axis, a click-stop system which permits the lever member to be releasably arrested in each of a plurality of angular positions, a motion transmitting train which connects the lever member to a multiple-speed transmission of the associated bicycle, and mounting means for mounting the support member on the handle bar of the bicycle. In the improved gear shifting arrangement of the invention, there is provided a clamping device which is fastened to the support member and defines a passage adapted to receive the handle bar, and for thereby mounting the support member on the handle bar. The gear shifting assembly has a median plane, and the passage extends through the mounting means in a direction transverse to the median plane.

This arrangement makes it possible to mount the gear shifting assembly centrally on the handle bar in such a manner that the pivoting axis of the lever member is parallel to the direction of the passage for the handle bar.

In the mounted condition of the gear shifting arrangement, the median plane of the gear shifting arrangement is fixed contiguously adjacent the axis of rotation of the steering column, and the accessible terminal handle portion of the gear shifting lever moves in a path substantially parallel to the median plane and axially remote from the steering column during pivoting movement of the lever.

Other features, additional objects, and many of the attendant advantages of this invention will be appreciated readily as the invention becomes better understood by reference to the following detailed description of preferred embodiments when considered in connection with the accompanying drawing in which.

Figure 1:
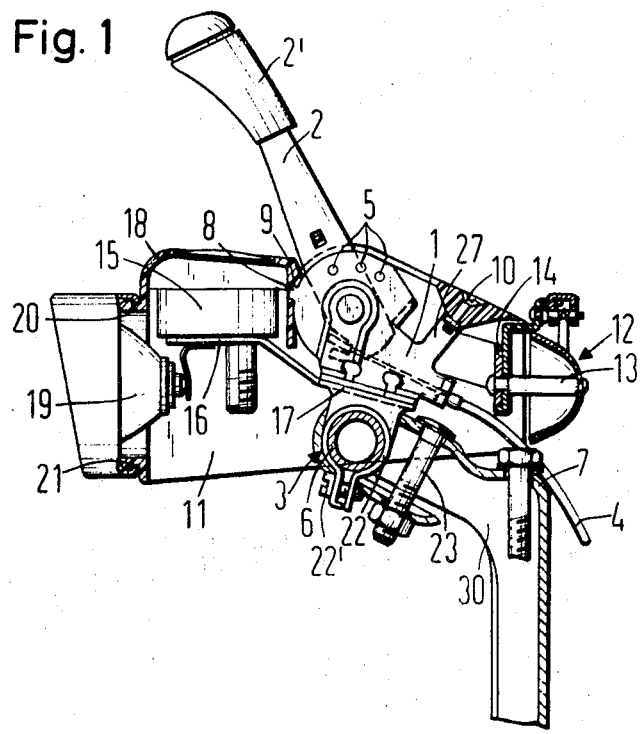
FIG. 1 shows a bicycle equipped with a gear shifting arrangement of this invention in fragmentary side-elevation in section on the upright median plane of the bicycle frame and of the gear-shifting arrangement.

The drawing shows only as much of a bicycle as is needed for an understanding of this invention. The portion omitted may be entirely conventional and includes the frame, the front fork and the front wheel mounted in the fork, the rear wheel and the associated multiple-speed transmission, the saddle, and other devices associated with the omitted elements.

The backbone of the gear shifting arrangement with which this invention is more specifically concerned is a support member 1 of heavy sheet metal. The main upper portion of the support member 1 is upright and located approximately in the median plane of the gear shifting arrangement. A pivot pin 26 fastens a gear shifting lever 2 to the support member 1. A plastic handle 2' on the free end of the longer lever arm moves in an arc contiguous and parallel to the median plane when the lever 2 is pivoted. The support member 1 is attached to the handle bar 6 of the bicycle by a mounting assembly 3 or 3' which will presently be described in more detail.

One end of the wire or inner portion of a Bowden cable 4 is attached to the shorter arm of the lever 2. The non-illustrated other end is connected to a speed-changing element in the multiple-speed transmission (not shown). The spiral wire casing of the cable 4 abuts against the support member 1. The lever 2 is releasably arrested in each of three angular positions on the support member 1 by a click-stop arrangement which includes bores 5 spaced on the support member 1 in an arc about the pivot axis of the lever 2, a bearing ball 24, and a leaf spring 25 on the lever 2 which biases the ball 24 toward engagement with the bores 5.

The handle bar 6 has a diameter of somewhat more than 1 inch and less than 2 inches, as is customary, and other dimensions of the apparatus may be deduced from the drawing which represents actual embodiments of the invention in their proper dimensional relationships.

The handle bar 6 is fastened to the steering column 7 of the bicycle by a connecting arm 30 of the latter in such a manner that the handle bar is generally perpendicular to the axis about which the steering column rotates in the front end of the non-illustrated frame, and offset radially from the axis of the steering column.

The support member 1 and a portion of the mounting assembly 3 are upwardly and laterally covered by a plastic housing 11 attached to the support member 1 by a screw 10 engaging an angle bracket 27 on the support member and by projections 8 on the support member 1 engaging conforming openings 9 in the housing, only one projection and opening being visible in the drawing.

A signal bell 12 is mounted on the rear face of the housing 11 opposite the rider by means of a stud 13 projecting from an integral angle bracket 14 on the support member 1 beyond the housing. The bell is operated by means of a hammer 12' pivotally mounted on the bracket 14. When a button 12'' on the lever is pushed, the hammer is lifted from the bell against the restraining force of a return spring, and it strikes the bell when the button is released.

A speedometer 15 is attached within the housing 11 to a lug portion 16 of a base plate 17. The lug portion is thin enough to provide a somewhat resilient support for the speedometer which is accessible for viewing through a window 18 in the housing 11.

The lever 2 passes in a generally upward direction through a slot in the housing 11 which is elongated to permit pivoting lever movement. The housing carries indicia I,II,III adjacent the slot to indicate the lever positions in which the associated transmission is set for its first, second, and third transmission ratios or speeds respectively. The lever 2 is not shown in the same angular position in all Figures of the drawing for reasons of convenient pictorial representation.

An opening in the front end of the housing 11 partly receives a headlight 19 which is fastened to the housing by conforming engagement of a rim on the headlight with an outer circular groove 20 in the somewhat resilient housing. The groove is bounded in a forward direction by an oblique side of a bead 21 which holds the headlight with a snap fit.

Figure 2:
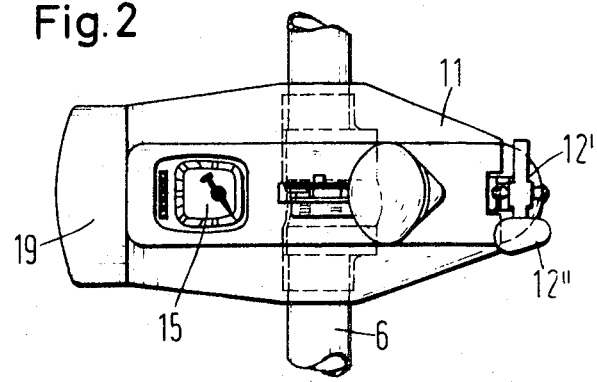
FIG. 2 is a top plan view of the apparatus of FIG. 1.
Figure 3:
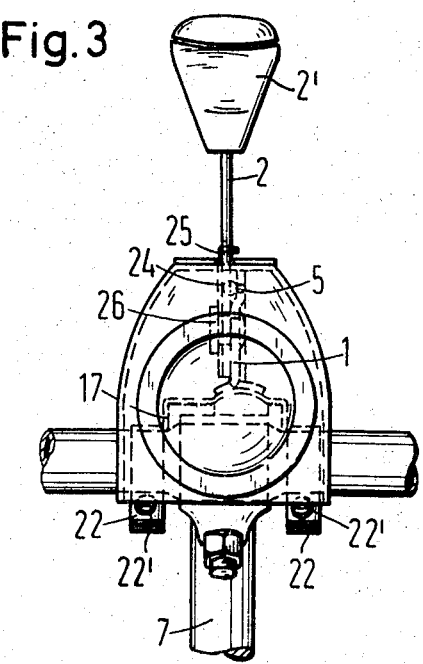
FIG. 3 illustrates the apparatus of FIG. 1 in front elevation.
Figure 4:
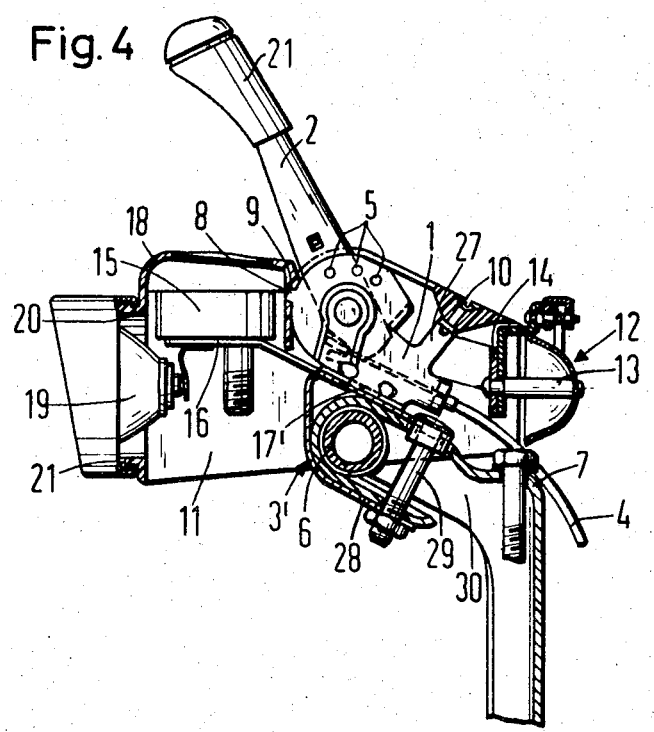
FIG. 4 shows a bicycle equipped with a modified gear shifting arrangement in a view corresponding to that of FIG. 1.

The structure described so far is common to the two embodiments of the invention respectively shown in FIGS. 1 to 3 and in FIG. 4. The mounting assembly 3 shown in FIGS. 1 to 3 is approximately U-shaped in front view. The afore-mentioned base plate 17 constitutes the bight portion of the U-shape and is integrally joined to the dependent leg portions which include respective clamping straps 22. The lower portion of the support member 1 is split into lugs bent out of the median plane of the gear shifting arrangement and welded to the base plate 17 in conforming engagement.

The clamping straps 22 have respective inner, concavely arcuate faces which conformingly engage a cylindrical central portion of the handle bar 6 on opposite sides of the connecting arm 30, and have a common axis of curvature which coincides with the axis of the engaged handle bar portion in the mounted condition of the gear changing arrangement. The clamping straps 22 are each tightened about the handle bar 6 by a tightening screw 22'.

The free end of the connecting arm 30 is hook-shaped so as to be expandable, and tightened about the center of the handle bar 6 by a screw 23. With the centrally cylindrical handle bar 6 shown in the drawing, the hook-shaped end of the connecting arm 30 and the two clamping straps 6 define an almost continuous passage which is partly bounded by the concave faces of the straps 22 and extends through the mounting assembly 3 in a direction perpendicular to the median plane of the gear shifting arrangement and parallel to the pivot axis of the pin 26. The screws 22', 23, when turned, move the straps 22 and the hook portion of the arm 30 as far inward of the passage as the handle bar 6 permits, and thereby reduce the cross-sectional area of the passage.

The clamping straps 22 are spaced longitudinally of the handle bar 6 sufficiently to receive therebetween the arm 30 of the steering column whose transverse dimensions are closely similar to or identical with those of the handle bar 6. The spacing of the clamping straps 22 thus must be at least equal to the greatest transverse dimension of the engaged handle bar portion.

The gear shifting arrangement shown in FIG. 4 is identical with that described above with reference to FIGS. 1 to 3 except for its mounting assembly 3' and the cooperation of the mounting assembly with the arm 30 and the handle bar 6.

The base plate 17' is welded to the support member 1 and has a central integral lug 28 which is bent downward and backward about the hook-shaped end portion of the arm 30 and the center of the handle bar 6 enclosed within the hook shape. A single tightening screw 29 passes through a pair of aligned openings in the arm 30 and through openings in the base plate 17' and the lug 28 which are tightened by turning a nut 31 on the screw 30.

The same basic arrangement may be used with fewer accessories than have been shown in the drawing and described above. Thus the same mounting assembly and housing may be used without a headlight and/or tachometer and/or bell if so desired, and the corresponding openings in the housing 11 plugged by removable caps which permit the accessories to be added later.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a bicycle, in combination:
   a. a steering column mounted for rotation about an axis;
   b. a handle bar;
   c. connecting means fixedly connecting said handle bar to said steering column in a position in which the handle bar is elongated transversely of said axis,
      1. said connecting means including an expandable connecting member fixedly mounted on said steering column and extending about said handle bar;
   d. a gear shifting arrangement for operating a multiple speed transmission of said bicycle, said arrangement having a median plane and including
      1. a support member contiguously adjacent said plane,
      2. a gear shifting lever having an accessible terminal handle,
      3. pivot means securing said lever to said support member for pivoting movement about an axis transverse to said plane, said handle portion moving in a path substantially parallel to said plane during said pivoting movement of the lever; and e. fastening means fixedly fastening said gear shifting arrangement to said handle bar in a position in which the axis of rotation of said steering column is located contiguously adjacent said plane, said fastening means including
  1. a clamping member extending about said connecting member and fixedly secured to said support member, and
  2. tightening means for tightening said clamping member about said connecting member and said handle bar.

2. In a bicycle as set forth in claim 1, a housing mounted on said support member and enveloping said support member and said plate member, and fastening means for fastening a plurality of accessories to said support member in respective positions in which said accessories are accessible from outside said housing.

3. In a bicycle as set forth in claim 1, and said tightening means including a threaded member engaging said clamping member for tightening the same about said connecting member and for thereby tightening the connecting member about said handle bar when said threaded member is turned.

4. In a bicycle, in combination:
  a. a steering column mounted for rotation about an axis;
  b. a handle bar;
  c. connecting means fixedly connecting said handle bar to said steering column in a position in which the handle bar is elongated transversely of said axis,
    1. said connecting means including an expandable connecting member elongated transversely of said axis, said connecting member being fixedly mounted on said steering column and extending about said handle bar;
  d. a gear shifting arrangement for operating a multiple speed transmission of said bicycle, said arrangement having a median plane passing through said connecting member and including
    1. a support member contiguously adjacent said plane,
    2. a gear shifting lever having an accessible terminal handle,
    3. pivot means securing said lever to said support member for pivoting movement about an axis transverse to said plane, said handle portion moving in a path substantially parallel to said plane during said pivoting movement of the lever; and
  e. fastening means fixedly fastening said gear shifting arrangement to said steering column in a position in which the axis of rotation of said steering column is located contiguously adjacent said plane, said fastening means including
    1. two integrally connected clamping members fixedly fastened to said support member and extending about respective longitudinal portions of said handle bar oppositely offset from said connecting member, and
    2. threaded tightening means for respectively tightening said connecting member and said clamping members about said handle bar.

* * * * *